United States Patent [19]
Markel et al.

[11] 3,731,491
[45] May 8, 1973

[54] OIL CONTAINMENT BOOM

[75] Inventors: Arthur L. Markel; J. Robert R. Harter, both of Miami, Fla.

[73] Assignee: Reynolds Submarine Services Corporation, Miami, Fla.

[22] Filed: Oct. 12, 1971

[21] Appl. No.: 188,324

[52] U.S. Cl. .............................................. 61/1 F, 61/5
[51] Int. Cl. ............................................. E02b 15/04
[58] Field of Search ................................... 61/1 F, 5

[56] References Cited

UNITED STATES PATENTS

| | | | |
|---|---|---|---|
| 3,695,042 | 10/1972 | Denison | 61/1 F |
| 3,597,924 | 8/1971 | Risin et al. | 61/1 F |
| 3,608,316 | 9/1971 | Manuel | 61/1 F |
| 3,499,291 | 3/1970 | Mikkelsen | 61/1 F |

OTHER PUBLICATIONS

Ocean Industry, June 1970, p. 60.

*Primary Examiner*—David J. Williamowsky
*Assistant Examiner*—David H. Corbin
*Attorney*—Warren N. Low et al.

[57] ABSTRACT

An oil containment boom comprising an elongated strip of corrugated metal which is formed from a plurality of sections secured together end-to-end. The corrugated metal is disposed substantially vertically in a body of water and floated therein with suitable flotation means. In one form of the invention, the flotation means comprises a strip of plastic material adhesively secured to the corrugated metal. In another form of the invention, the previously described flotation means is supplemented with the aid of outrigger or stabilizer floats which extend generally laterally outwardly from the corrugated metal strip. Weights may be attached to the corrugated metal strip to vary the freeboard height of the floating boom.

1 Claim, 6 Drawing Figures

Patented May 8, 1973 3,731,491

INVENTORS
ARTHUR L. MARKEL
J. ROBERT R. HARTER

BY Low & Matthews
ATTORNEYS

Patented May 8, 1973

OIL CONTAINMENT BOOM

This invention relates to an oil containment boom and, more particularly, to such a boom formed primarily from corrugated sheet metal stock material.

In recent years an increasing amount of attention has been paid to means for diminishing the pollution of our harbors, waterways and high seas caused by the presence of oil slicks thereon deposited either by the wanton acts of certain individuals or by accident. One generally recognized procedure for removal of these oil slicks is to contain or concentrate an oil spillage with the aid of a floating boom means and then pump or draw in the contained oil into a suitable apparatus for separating oil from water.

One such suitable apparatus for separating oil from water is illustrated and described in my copending U.S. Pat. application Ser. No. 833,105, filed June 13, 1969, entitled METHOD OF AND APPARATUS FOR SEPARATING FLUIDS HAVING DIFFERENT DENSITIES now U.S. Pat. No. 3,595,392.

While it has been generally known to contain or concentrate oil spillages with floating boom members, none possess the relative simplicity of the present invention insofar as stock materials from which the boom is formed, or the ease and rapidity with which the boom may be deployed, returned to the side of a boat and cleaned.

In accordance with the present invention, an oil containment boom is formed into an elongated strip of corrugated metal by securing together sections of corrugated sheet metal in end-to-end fashion. The corrugated sheet metal is preferably corrugated aluminum sheet, such as alloy 3003 as designated by The Aluminum Association. The corrugations in the aluminum sheet material are oriented vertically to provide floating flexibility in both the vertical and horizontal planes.

A single strip of plastic material provides the required flotation to give the fence-like boom about one foot of freeboard and provides a reserve buoyancy of approximately 100 percent. The fence-like boom may be constructed in continuous sheets 100 feet or longer by about four feet or greater in width. The freeboard may be varied up to one-half of the vertical height of the boom for heavy sea conditions.

By way of a specific example, one boom made in accordance with the present invention weighed approximately 2.5 pounds per lineal foot. For storage, 100 linear feet of the boom was compactly received on a spool 45 inches by 4 feet in diameter. The boom may be launched by unspooling, or in quick deployment operations, by dropping it from an aircraft or vessel in a compact, coiled cylinder. When floating, a girth strap is released, the fence or boom unwinds itself and is ready for use.

The bottom of the fence-like boom is weighted to provide a good metacentric height and stability in a seaway. For use in rough sea conditions, small lightweight stabilizer or outrigger floats may be bolted to the boom to provide further reserve flotation and a righting moment arm to each side of the boom. The stabilizer or outrigger floats may be attached at regular intervals such as 6 foot intervals.

The side of the boom not containing the plastic flotation means would normally be the side of the boom exposed to the oil slick. Therefore, there is provided a smooth surface for easy cleaning when operations are finished. In order to attach one section of the boom to another, flexible fabric reinforced rubber couplings may be utilized or the sections may be bolted together.

The inherent advantages and improvements of the present invention will become more readily apparent upon considering the following detailed description of the invention and by reference to the drawings in which.

Figure 1:
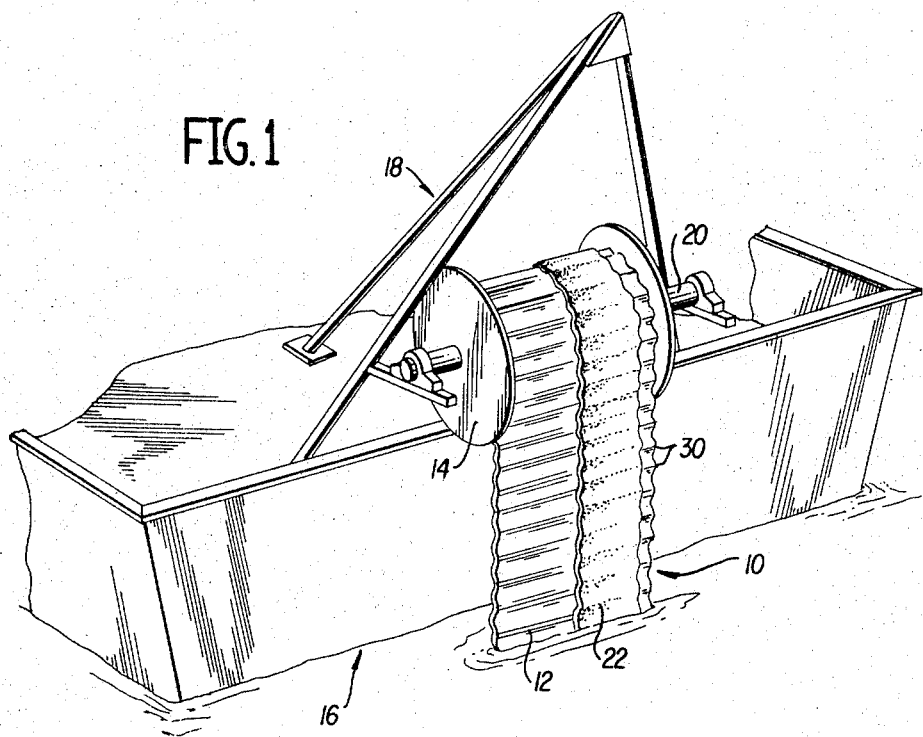
FIG. 1 is a perspective view, fragmentary in nature, illustrating the unreeling of an oil containment boom of the present invention.

Referring now to FIGS. 1—4 of the drawings, there is illustrated a boom indicated generally at 10 formed from corrugated aluminum sheet material 12. FIG. 1 illustrates one method by which the boom may be introduced into a body of water from a spool means 14. The latter is supported at the stern of a ship indicated generally at 16. The spool means 14 is supported by a suitable holder means 18 and is rotatable on axle 20.

Figure 2:
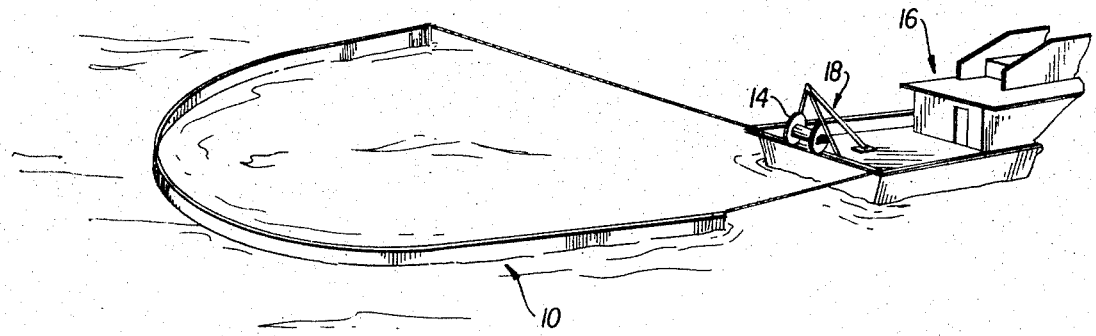
FIG. 2 is a perspective view illustrating the deployment of an oil containment boom behind a small boat.

In FIG. 2, the boom 10 has been deployed and is being pulled by a suitable cable means attached to the end of the boom so as to contain an oil slick or the like on the surface of the body of water. Oil containment booms made in accordance with the present invention have been towed at speeds up to 4 knots per hour.

Figure 3:
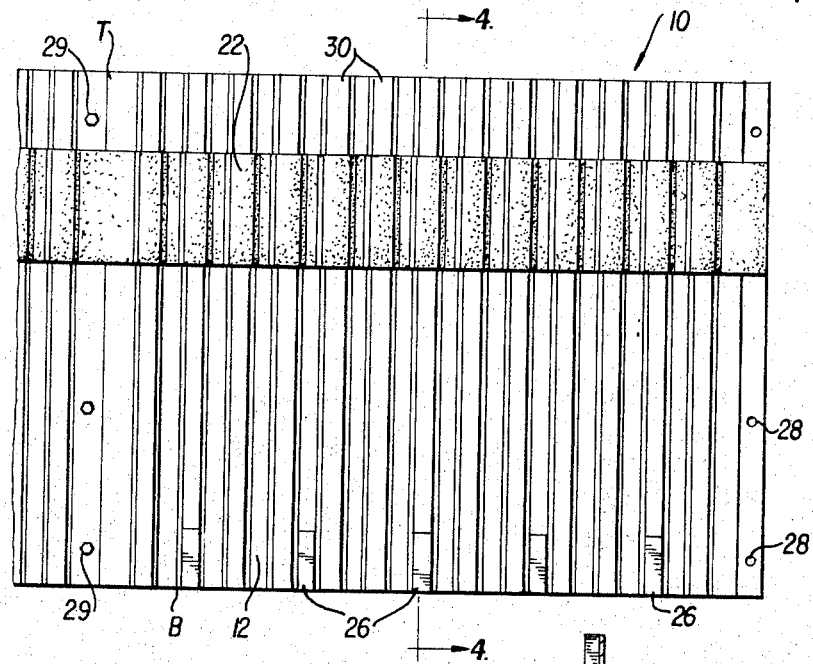
FIG. 3 is an elevational view of a portion of the oil containment boom of the present invention.
Figure 4:
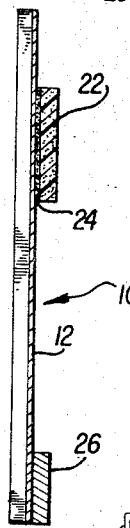
FIG. 4 is an elevational view taken in vertical cross section along line 4—4 of FIG. 3.

A plastic floating means 22 is suitably attached to the sheet of corrugated aluminum 12 as it is being unwound from spool 14 such as by means of a contact cement 24 in order to secure the plastic floating means 22 to the corrugated aluminum sheet 12. FIGS. 3 and 4 show the use of metal weights 26 which provide means to vary the freeboard height of the boom 10 when it floats substantially vertically in a body of water. While it is preferred to make the weights 26 from aluminum to avoid galvanic action, other materials including lead may be used. Adjacent ends of the corrugated aluminum sheet 12 are shown to be provided with holes 28 through which may be received suitable bolts 29 and wing nut assemblies in order to secure the sheets together. Other suitable means may be used to join the sheets together. The corrugations are illustrated at 30 for the corrugated aluminum sheet material 12. These corrugations are oriented vertically in order to provide floating flexibility in both the vertical and horizontal planes for the boom 10.

By way of illustration, and without limitation, one boom was constructed in accordance with the present invention from corrugated aluminum sheet with the sheet being formed from alloy 3003 – H 34 as designated by The Aluminum Association. The sheet had a thickness of 0.024 inches, a corrugation depth of 0.875 inches and a corrugation spacing of 2.66 inches. The boom had a width of 48 inches measured from top T to bottom B in FIG. 3 and a weight per linear foot of 2.75 pounds. Each section of corrugated aluminum sheet was 100 feet in length. This produced a freeboard of about 16 inches and a draft of about 32 inches when the boom was disposed in a body of water. The tensile strength for the boom was in excess of 1 ton and the plastic floating means 22 was formed from nitrile rubber base monocellular foam. The boom had a reserve buoyancy of 100 percent. Horizontal flexibility was provided by the vertical corrugations 30 and vertical stability was also provided from the vertical corrugations and metacentric height.

Figure 5:
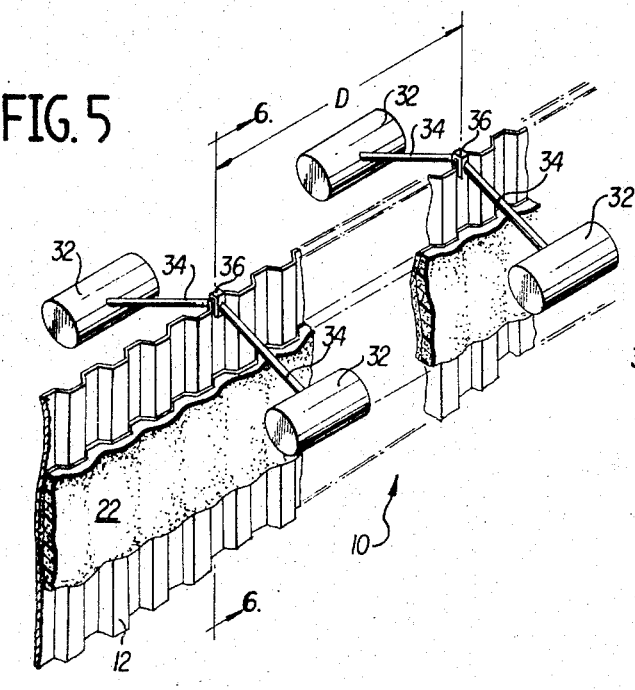
FIG. 5 is a fragmentary perspective view of a modified form of oil containment boom; and, FIG. 6 is an elevational view taken in vertical cross section along line 6—6 of FIG. 5.
Figure 6:
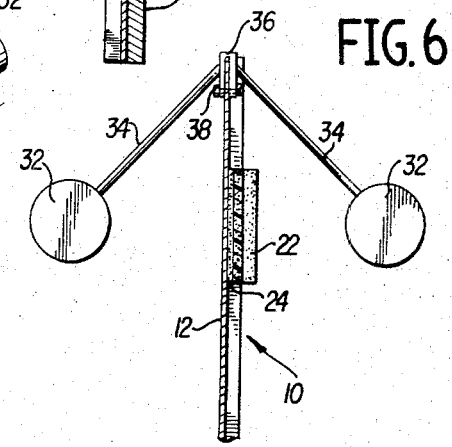

A modified embodiment is illustrated in FIGS. 5 and 6 especially useful in heavy sea conditions. Reference to these figures shows the use of stabilizer or outrigger floats 32 suspended or extending generally laterally outwardly from spars 34 which are affixed to boom 10 with the aid of C-shaped clamps 36 and a bolt and nut assembly 38. Preferably, the C-shaped clamps 36 fit into corrugations 30. The distance D in FIG. 5 between the attachment of adjacent pairs of stabilizer or outrigger floats between the C-shaped clamps is preferably regular and in one boom construction was 6 feet.

It will be apparent that the oil containment boom of the present invention uses no longitudinal cables or other strengthening members. Nevertheless, its tensile strength of the metal sheet is well in excess of a ton.

The flexibility afforded by the corrugations provides sea-keeping compliance and increases the boom's effective strength. The increased surface area of the corrugation tends to have an adhesive effect causing oil to adhere to it at the water line.

All metallic components of the containment device are preferably galvanically compatible for long life in a salt water environment.

While the invention has been described with respect to the containment of an oil slick, this description is to be taken symbolically in that the invention is applicable to the containment of any substance or objects on or near the surface of the water provided that the substances or objects have densities less than water.

The most important single feature of this invention is that the sheet metal be corrugated. Thus it can be shown by relatively straightforward stress analysis and by considering the boom to be a vertically disposed beam acted upon at right angles thereto by the current force of the water that the stiffness of the boom is markedly increased by corrugating it. Calculations on a section of a boom whose thickness if 0.024 inches whose width is 0.75 inches and whose length (depth in water) is 36 inches and assuming expansion of a 0.875 inches corrugation to 0.75 inches (well within its elastic limits) and further assuming stresses within the allowable fiber stresses for aluminum results in an increase in vertical stiffness on the order of 250 times.

While presently preferred embodiments of the invention have been illustrated and described, it will be recognized that the invention may be otherwise variously embodied and practiced within the scope of the claims which follow.

What is claimed is:

1. An oil containment boom comprising
    a. an elongated strip of corrugated aluminum alloy sheet metal formed solely from a single thickness of corrugated sheet sections secured end-to-end to provide a length greatly in excess of its width,
       1. said elongated strip having a first corrugated side which is substantially smooth and unencumbered and which is adapted to be presented to oil slicks or the like when said strip is positioned in a body of water thereby facilitating cleaning thereof when said strip is removed from said body of water,
    b. flotation means consisting of a substantially continuous, elongated strip of plastic foam material adhesively secured to a second corrugated side of said elongated strip opposite from said first smooth and unencumbered corrugated side,
    c. means to vary the freeboard height of said elongated strip of corrugated aluminum alloy sheet metal with said means consisting of weights attached to said elongated strip on said second corrugated side thereof opposite from said first smooth and unencumbered corrugated side,
    d. a plurality of C-shaped clip means attached serially to the top of said elongated strip when said strip is disposed in a body of water, each of said clip means being shaped to fit the corrugations of said elongated strip with said elongated strip being disposed between the legs of said clip means, attachment means extending through aligned apertures in said legs and elongated strip for securing said clip means to said elongated strip,
    e. a series of pairs of spar members, each of said clip means having adjacent ends of one of said pairs of spar members received therein with the respective other ends extending laterally outwardly on opposite sides of said elongated strip,
    f. and auxiliary stabilizer float members attached to the other ends of each pair of spar members.

* * * * *